Figure 5:
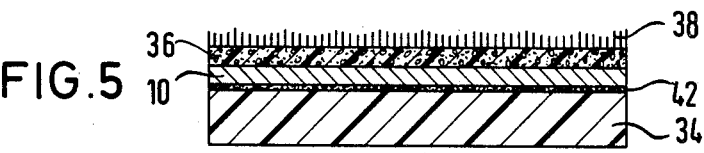

United States Patent [19]

Landler et al.

[11] 4,418,106

[45] Nov. 29, 1983

[54] METHOD OF PRODUCING A FLOCKED COMPOSITE BODY

[75] Inventors: Josef Landler, Wolfratshausen; Max Mayr, Hart, both of Fed. Rep. of Germany

[73] Assignee: Alkor GmbH Kunstoffverkauf, Munich, Fed. Rep. of Germany

[21] Appl. No.: 483,418

[22] Filed: Apr. 12, 1983

Related U.S. Application Data

[63] Continuation of Ser. No. 127,856, Mar. 6, 1980, abandoned.

[30] Foreign Application Priority Data

Mar. 15, 1979 [DE] Fed. Rep. of Germany ....... 2910234
Jul. 24, 1979 [DE] Fed. Rep. of Germany ....... 2930007

[51] Int. Cl.³ .............................................. B32B 3/26
[52] U.S. Cl. ......................................... 428/89; 156/78;
156/209; 156/220; 427/26; 427/206; 428/90;
428/95; 428/174; 428/282; 428/284; 428/308.4;
428/317.1
[58] Field of Search .......................... 156/78, 209, 220;
427/26, 206; 428/88, 89, 90, 95, 174, 282, 284,
308.4, 317.1; 521/90

[56] References Cited

U.S. PATENT DOCUMENTS

| | | | |
|---|---|---|---|
| 3,085,896 | 4/1963 | Britt et al. | 427/206 |
| 3,354,020 | 11/1967 | Copeland | 428/86 |
| 3,822,173 | 7/1974 | Graber et al. | 428/90 X |
| 3,856,598 | 12/1974 | Gregorian et al. | 428/90 X |
| 3,979,538 | 9/1976 | Gilman et al. | 428/90 |
| 3,993,806 | 11/1976 | Athey | 428/90 X |
| 4,000,028 | 12/1976 | Hoey | 156/220 X |
| 4,022,643 | 5/1977 | Clark | 156/78 |
| 4,034,134 | 5/1977 | Gregorian et al. | 428/86 |
| 4,056,646 | 11/1977 | Westfall et al. | 428/90 |
| 4,362,773 | 12/1982 | Shikinami | 428/90 |

FOREIGN PATENT DOCUMENTS

| | | |
|---|---|---|
| 10246 | 4/1980 | European Pat. Off. . |
| 1504799 | 6/1965 | Fed. Rep. of Germany . |
| 1947434 | 4/1970 | Fed. Rep. of Germany . |
| 1629691 | 1/1971 | Fed. Rep. of Germany . |
| 1621940 | 4/1972 | Fed. Rep. of Germany . |
| 2315741 | 10/1973 | Fed. Rep. of Germany . |
| 2255149 | 2/1977 | Fed. Rep. of Germany . |
| 2606339 | 8/1977 | Fed. Rep. of Germany . |
| 2708842 | 9/1978 | Fed. Rep. of Germany . |
| 2650628 | 11/1978 | Fed. Rep. of Germany . |

OTHER PUBLICATIONS

South African Application 754901.
Pfersee Information (Manual Brochure), Chemische Fabrik Pfersee GmbH, Augsburg Germany.

*Primary Examiner*—Robert A. Dawson
*Attorney, Agent, or Firm*—Toren, McGeady and Stanger

[57] ABSTRACT

A method for producing a flocked web by applying a layer of a thermosetting plastic foam onto a carrier sheet which foam penetrates into the surface of the carrier, flocking the uncrosslinked layer and then thermally hardening the layer and wherein prior to complete crosslinking of the flocked layer, the partially crosslinked flocked layer is submitted to heat pressing. In a preferred embodiment, the heat pressing can include an embossing step. The process of the present invention is not only easy to carry out, it avoids the presence of air bubbles as well as other inconsistancies in the product. The product obtained with the present invention is also disclosed.

32 Claims, 13 Drawing Figures

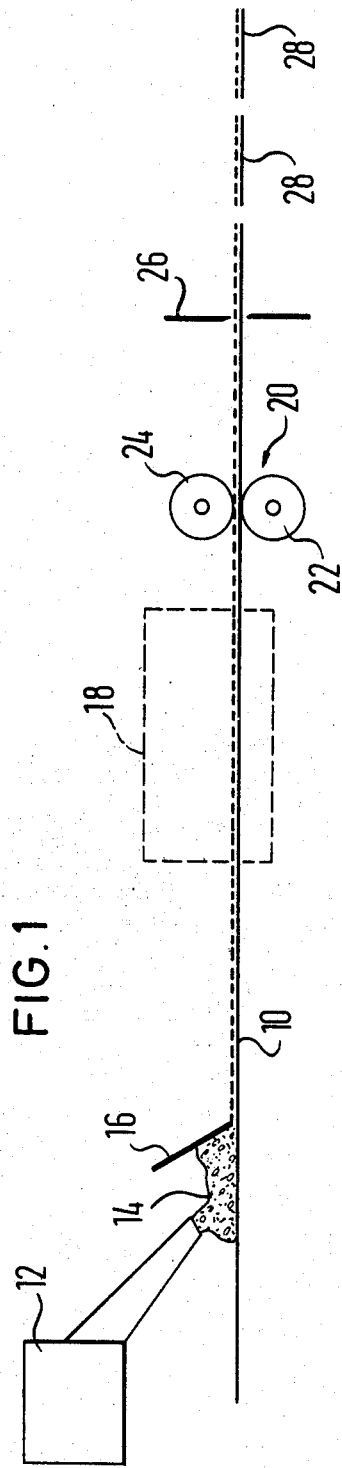
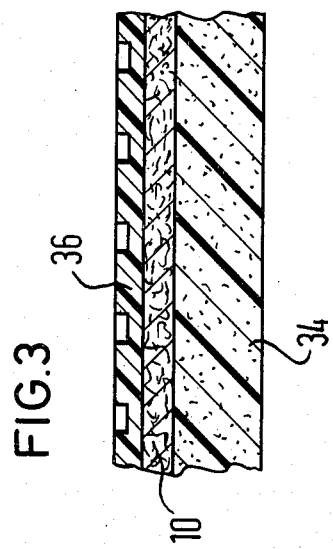
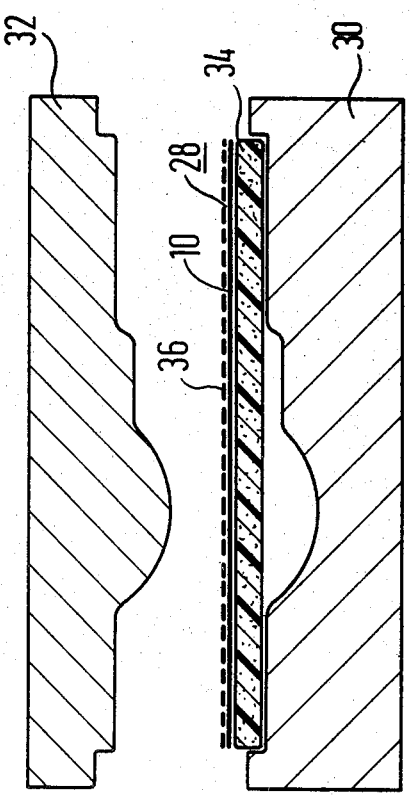

METHOD OF PRODUCING A FLOCKED COMPOSITE BODY

This is a continuation of application Ser. No. 127,856, filed Mar. 6, 1980 and now abandoned.

The invention relates to a method of producing a composite body, wherein a layer of cross-linkable plastics material is applied on a sheet carrier and is subsequently dried and hardened.

In accordance with the invention, it is proposed that the surface of the layer of plastics material is deformed prior to hardening or after an at least partial hardening.

It has been found that with the method according to the invention it is possible to obtain permanent and exact changes of the surface with, if desired, a fine structure, particularly with respect to decorative effects.

A first type of treatment resides in subjecting the surface of the layer of plastics material to the influence of a rotating roller which is equipped with tabs or strips prior to hardening.

Another type of treatment in accordance with the invention resides in subjecting the layer of plastics material to an embossing treatment prior to hardening or after an at least partial hardening.

The embossing treatment preferably is carried out after a first drying and hardening treatment, wherein the degree of hardening is adjusted in the first heat treatment in dependence on the type of further treatment carried out after embossing, so that the fine structure obtained by the embossing treatment is influenced only insignificantly or not at all. In the individual case, the required conditions for drying and cross-linking in the first heat treatment can be determined by simple preliminary tests, so that a sufficient capability of embossing still exists after the first heat treatment, but that, on the other hand, the embossing is not destroyed during the subsequent further treatment.

The embossing treatment can take place concurrently with a heat treatment, wherein, if desired, a supplemental hardening can be carried out.

The embossing treatment can be effected between rotating and, possibly, heated rollers; however, the treatment can also be performed between stationary and, possibly, heated press plates.

Particularly interesting effects result from flocking, drying and at least partially hardening the layer of plastics material prior to the surface deformation of the layer. Subsequently, the treatment with rotating rollers equipped with tabs or the embossing treatment can be performed. Embossing makes it possible to modify to a significant extent the velours-like character of the flock layer. For example, by embossing the flock layer, a surface structure of the type of a woven or knitted textile web or a leather-like surface can be obtained.

The sheet carriers to be used are particularly carriers which are permeable to air and which can be deformed to surfaces of a higher order without a significant formation of folds. Surfaces of a higher order are particularly understood to be spatial surfaces which are neither cylindrical nor prismatic, for example, shell-shaped or cup-shaped surfaces.

Fiber-containing sheet carriers have been found particularly suitable; particularly to be mentioned among these are, for example, polyester-spunbonded webs or polypropylene bonded fiber webs, whose fiber bond can be adjusted in such a way that a deformation to surfaces of a higher order is possible. Moreover, bonded webs are suitable because a portion of the fibers of the webs can be adjusted in such a way that they extend perpendicularly to the plane of the web; this may favorably influence the bond to the layer of plastics material, but also to the layers on the other side through mechanical anchoring. This advantage exists particularly in the so-called needle bonded webs which have been treated with needles which perpendicularly penetrate the bonded web and, possibly are barbed, so that at least a portion of the fibers extends perpendicularly of the plane of the web.

The plastics material is preferably applied in the form of an aqueous dispersion which is dried and hardened through a heat treatment. However, it is also conceivable to use plastic pastes which contain solvents. Finally, it is also conceivable to apply a plastics material on the basis of a liquid mixture of interreacting components, wherein the hardening takes place as a result of the reaction.

Specially interesting products can be obtained if the plastics material is applied in the form of foam. This foam can be formed preferably by a mechanical treatment and may contain a foam stabilizer.

However, it is also possible to apply the plastics material as a dense coating which is essentially free of air.

In view of the further processing of the product, it may be of great interest to adjust the plastics material to be applied with respect to its consistency during the application, i.e. with respect to its viscosity (if a dense coating is to be applied) and with respect to its stiffness (if a foam is to be applied), in relation to the porosity of the carrier web in such a way that the plastics material superficially penetrates the carrier web, but does not completely penetrate through the web. It has been found that, with this measure, the coated material retains its capability of deformation even after drying and the preliminary or final hardening, so that an adjustment to complicated surface shapes of objects to be coated remains possible. If, however, the plastic foam completely penetrates through the carrier during the application, it is possible that a very stiff material is obtained already after drying and particularly after the complete hardening, so that an adjustment to surfaces of a higher order is no longer possible or only to a very limited extent.

Following the drying and, possibly the partial hardening, the sheet carrier can be connected to an additional backing on its side remote from the plastics material application. For example, it can be connected to a backing which increases the stiffness in the form of a backing panel or a blank of a backing web. In doing so, an adhesion mediator or an adhesive may be used.

Of special interest is the connection of the sheet carrier which is coated with the plastic material to a backing web or a backing panel, wherein, at the time the connection is made, a three-dimensional deformation in the sense of a formation of surfaces of a higher order is imparted to both components. This can be done between reciprocating top and bottom parts of a press. In this connection, it is conceivable that the plastics material surface is embossed already during the connection and deformation or is otherwise deformed in order to obtain functional or decorative effects. However, it is also conceivable that an embossment is applied only at the time of connection, in which case the part of the press which faces the plastics material coating is provided with an appropriate embossment pattern. By applying the embossment only at the time of deformation, it is possible to effect an exact adjustment of the embossment pattern to the surface to be created, for example, seams or edges.

The problem of the formation of air inclusions and the formation of bubbles occurs when a sheet carrier coated with plastics material is combined and simultaneously compression molded with a backing. This problem can be managed particularly easily in the method according to the invention if the sheet carrier and the plastics material layer are permeable to air. This is particularly the case if the sheet carrier is formed of a fibrous web, for example, a bonded web and if the plastics material is applied in the form of an at least partially open-cell foam. However, the problem of the formation of bubbles can also be managed by using a material as the sheet carrier which is suitable for discharging or compensating for air inclusions. Particularly suitable for this purpose are the above-mentioned bonded webs, particularly needle bonded webs and the latter, in turn, are particularly suitable if the weight per unit area of the needle bonded web is at least 50 g/m², preferably at least 70 g/m² and the fiber length is at least 40 to 60 mm.

Suitable backing panels are particularly those produced with the use of a thermoplastic material as the binder and with the use of a filler, for example, so-called polyolefin/wood dust panels which preferably have a 50% by weight content of wood dust. Due to their content of thermoplastic binder, these panels can be especially easily connected to the sheet carrier, particularly if the carrier, because of its fiber structure, has the tendency to be mechanically anchored in the thermoplastic binder. This is particularly true for the sheet carriers which are formed by bonded webs, for example, needle bonded webs. If the thermoplastic material arranged as the binder between the filler particles is not sufficient for forming a strong bond between the backing panel and the sheet carrier, it is also conceivable to provide the backing panel on its side facing toward the sheet carrier with an additional thermoplastic layer, particularly a thermoplastic layer of the same thermoplastic material which is also present as the binder within the backing panel and, therefore, is easily connected to the binder of the backing panel. A preferred way of obtaining the connection betwen such backing panels and the sheet carrier resides in introducing in a press and jointly compression molding a backing panel containing a thermoplastic binder together with the sheet carrier in the hot state, wherein the connection to the sheet carrier is obtained through the thermoplasticized binder of the backing panel or a thermoplasticized coating of the backing panel. Of course, a deformation can again take place simultaneously. Since, in this procedure, the heat required for the connection and possibly the residual hardening of the plastics material layer is supplied by the heated blank of the backing panel, it is possible to keep cool the parts of the press themselves, possibly by an additional water cooling. This is advantageous also for obtaining a distinct embossment of a fine structure.

In this procedure, it is particularly advantageous that, in the final processing plant in which the sheet carrier coated with the plastics material is combined with the backing panel, it is only necessary to heat the backing panel and to perform the compression molding and that it is not required to apply, dry and harden the plastics material and the adhesion mediator. This is especially important because this final processing is frequently performed in processing plants, for example, automobile factories, in which lining parts are produced. Accordingly, these are plants which are not prepared for the processing of pasty or foamy plastics material and adhesives.

Other methods can be employed for applying a backing on the sheet carrier. For example, the plastics material can be sprayed or foamed onto the back of the sheet carrier. It is also conceivable to apply on the side of the sheet carrier opposite the plastics material application a positionally stable layer of adhesion mediator, so that the sheet carrier can be mounted and fastened on a body at any later time.

The positionally stable layer of adhesion mediator can be applied in the form of a foil or it can be spread on. If it is an adhesion mediator layer which is to be fastened on a body merely by pressure, and, therefore, is sticky even in the case of unintentional contact, this adhesion mediator layer can be covered until it is used with a cover foil or a cover paper. Finally, a backing of soft foam material can also be used as the backing for the sheet carrier.

A special advantage of the material produced in accordance with the invention and consisting of the sheet carrier and the applied layer of plastics material is also seen in the fact that this material does not have the tendency to separate from the backing to which it is connected. This danger of separation does not even exist when a deformation, particularly a three-dimensional deformation, of the sheet carrier takes place during the connection to the backing. For this reason, the material produced in accordance with the invention is particularly suitable for the manufacture of automobile lining parts which, due to the high temperatures to be expected during the use from the radiation of the sun, have the tendency to separate, particularly at the concave regions. In addition, the high dimensional stability of the material produced in accordance with the invention is very important not only for retaining a desired shape, but also for maintaining a desired surface structure.

If the plastics material is applied in the form of foam, the foam structure is maintained to a great extent even during the embossing. This results in products with a soft feel which can be further improved with the presence of flock, particularly an electrostatically applied flock. If flock is applied, it is of course essential for a satisfactory adhesion of the flock that it is applied on plastics material which is still quite soft, or particularly on plastics material which is wet, and that hardening is substantially effected subsequently. In this manner, the flock can be made very resistant to scraping, even in foamed plastics material.

Suitable fillers for the plastics material, no matter whether applied as a dense coating or as foam, are particularly kaolin, talcum and calcium carbonate.

The surface deformation of the layer of plastics material can also be carried out by means of smooth rollers or smooth parts of the press.

When easily deformable carriers are used, it has been found that the treatment according to the invention provides an excellent thermofixation. This is particularly true when textile webs or bonded webs are used as sheet carriers. Thermofixation means that the material can be further processed at high temperatures. In this connection, it is especially referred to printing by means of the transfer process, wherein printing ink is applied on an intermediate carrier and this intermediate carrier, with the ink side facing the plastics material coating, is then passed together with the sheet carrier between pressure rollers at a high temperature, wherein a migration of the printing inks can take place from the intermediate carrier to the plastics material coating. This transfer process can also be used when the hardened plastics material layer is flocked.

If the plastics material is applied on the sheet carrier in the form of an essentially air-free dense coating, the breathing activity of the obtained product is low. However, the breathing activity can be recovered during embossing. Even in very thin plastics material layers it is possible to obtain a certain breathing activity, particularly when the fibers of a fibrous sheet carrier enter the plastics material layer and possibly penetrate through this layer.

The enclosed figures explain the invention with the aid of an embodiment. In the drawings:

FIG. 1 shows an arrangement for carrying out the method according to the invention without flock coating, FIG. 2 shows an arrangement for combining a material produced in a accordance with FIG. 1 with a backing, FIG. 3 shows an enlarged detail of the material obtained from the arrangement according to FIG. 3, FIG. 4 shows an arrangement for carrying out a method according to the invention with flock coating, FIG. 4a shows a material obtained in the arrangement according to FIG. 4, FIG. 5 shows a material obtained in the arrangement according to FIG. 4, after being combined with a backing, FIGS. 6 to 9 show various other backings for the combination with the material obtained in accordance with FIG. 4, in analogy to FIG. 5.

Figure 10:
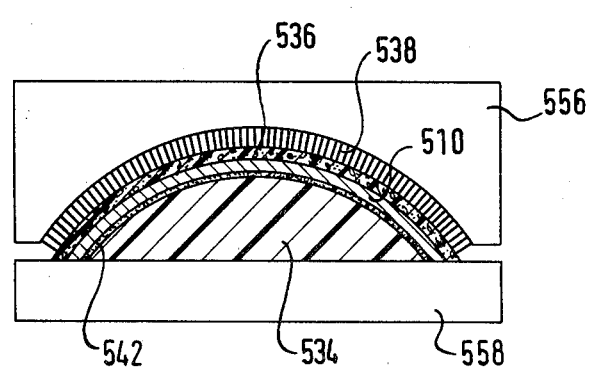

FIG. 10 shows an arrangement for molding onto a material produced in accordance with FIG. 4, FIG. 11 shows a material produced in accordance with FIG. 4 with an adhesion mediator layer, FIG. 12 shows a web of soft foam material to be combined with a material produced in accordance with FIG. 1 or 4.

In FIG. 1, a sheet carrier is denoted by 10. Above this sheet carrier there is arranged a foaming device 12 from which the foam 14 reaches the sheet carrier 10. A coating knife 16 spreads the foam on the carrier sheet 10 to a layer of uniform thickness. The foam is subjected to a first heat treatment in a heating tunnel 18 where the foam is dried and partially cross-linked. In an embossing station 20 with a bottom roller 22 and an embossing roller 24, a finely structured embossment pattern is embossed into the upper side of the dried and partially cross-linked foam. The decorative layer is cut into individual blanks 28 in a cutting station 26.

FIG. 2 shows a press having a bottom part 30 and a top part 32. A blank 34 of a polyolefin/wood dust panel consisting of 50% polypropylene and 50% wood dust is placed in the bottom part 30. On this blank 34 lies a blank 28 of a material which had been produced according to FIG. 1. The backing panel 34 is adjusted to a temperature of 180° C. The parts 10 and 32 are cold.

FIG. 3 shows a section of a plane portion of the deformed laminated panel which had been obtained in the press according to FIG. 2.

The following method examples shall serve for a further explanation of the invention. The first examples concern the composition of the foamed plastics material, followed by several examples concerning the processing.

Examples for the composition of the foamed plastics material:

EXAMPLE 1

100 parts by weight of a 45% aqueous dispersion of a thermally cross-linking polyacrylate to be obtained under the name "Dicrylan AM" from the Chemische Fabrik Pfersee GmbH, Augsburg, Germany, were put into a mixing vessel with agitator.

Subsequently, to this vessel there was added successively in the following sequence:

1.2 parts by weight laurylsulphate which is commercially available under the name Dicrylan-Verschäumer 7028 (Dicrylan foaming agent 7028) from the firm Chemische Fabrik Pfersee GmbH, Augsburg, Germany.

2 parts by weight ammonia, wherein the total solution has been adjusted to a pH-valve of 8.

6 parts by weight of a stearate acting as foam stabilizer, commercially available under the tradename Dicrylan-Stabilisator F from the firm Chemische Fabrik Pfersee GmbH, Augsburg, Germany.

2 parts by weight of a 30% aqueous polymethacrylate dispersion, commercially available under the name Dicrylan-Verdicker R [Dicrylan-thickener R] from the firm Chemische Fabrik Pfersee Gmbh Augsburg, Germany.

3 parts by weight of an ethylene urea/triazine resin commercially available under the name "Knitex CR" from the firm Chemische Fabrik Pfersee GmbH, Augsburg, Germany.

This mixture was agitated without foaming until a homogenous dispersion was obtained.

EXAMPLE 2

To obtain a black product, 7 parts by weight Unisperse-Black C-E of the firm Ciba Geigy, Switzerland, were stirred into the dispersion obtained according to Example 1.

EXAMPLE 3

To obtain a beige product, a pigment preparation was prepared which contained the following:

5 parts by weight titanium dioxide
4 parts by weight water
0.4 parts by weight Irgasol DAM (dispersion agent for titanium dioxide and other pigments for dispersing in water)
4 parts by weight Unisperse-yellow-Oxide M-E*
0.08 parts by weight Unisperse-Black C-E*
0.08 parts by weight Unisperse-Red RN-E* (Toluidine)

*Products of the firm Ciba Geigy, Switzerland.

This pigment preparation was added to the mixture according to Example 1.

EXAMPLE 4

To a dispersion according to Example 1, 5 parts by weight antimony trioxide and 5 parts per weight Pyrowates 4034 (bromium donor) of the firm Ciba Geigy were added to make it less flammable.

EXAMPLE 5

To a dispersion according to Example 1, 100 parts by weight titanium dioxide were added as filler which, before being added, was rubbed off in a roller frame and was made to a paste in water. Examples for the further processing:

EXAMPLE 6

The dispersions according to Examples 1 through 5 were beaten faomy with the addition of air in a foaming apparatus of the firm Hansa Werke, Bremen, Lürmann Schütte GmbH & Co., 2800 Bremen, Germany. The foam now essentially has a shaving foam-like consistency. The specific weight is about 200 g/l.

The foams obtained in this manner and discharged from the foaming apparatus 12 were directly supplied to a coating knife device 16 in which they were spread onto a polyester spunbonded web 10 according to FIG. 1 (60 g/m$^2$), in the amount of about 400 g foam per m$^2$ bonded web. During coating, the foam only superficially penetrated into the bonded web.

The web with the foam applied thereon was then dried in a heating duct 18 at an initial temperature of 140° C.; during a dwell time of 3 minutes, the temperature is raised in the following heating zones to an end temperature of 160° C. After drying, the foam was no longer sticky, but still very sensitive to pressure; finger impressions did not disappear.

The material dried in this manner was then embossed in an embossing calender 20 with hot rollers of a temperature of about 140° C. It was found that the embossed material could be stored over any length of time. Blanks of the embossed material were compression molded in a press according to FIG. 2 with cold mold parts with a polyolefin/wood dust panel 34 (wood dust portion about 50%, polypropylene portion about 50%) adjusted to 180° C. In this procedure, the polyolefin/wood dust panel was three-dimensionally deformed in the shape of a shell so that the shell carrier 10, including the embossed plastic foam layer 36, extended over concavely curved surface portions of the polyolefin/wood dust panel. The dwell time in the press was 30 to 45 seconds. After pressing, it was found that the foam had become insensitive to pressure and that the grain structure from the preceding embossment had been maintained and could no longer be destroyed by finger pressure. The appearance of the surface was uniformly dull or unpolished. During pressing, no bubbles were formed between the polyolefin/wood dust panel and the sheet carrier 10. This is partially due to the fact that the foam is impermeable to air during pressing.

In a 16 hour heat storage in 90° C. circulating air, no phenomena of separation of the decorative layer from the polyolefin/wood dust panel were found, even in the concavely formed surface regions.

EXAMPLE 7

In accordance with an alternative method, the material according to Example 6 emerging from the heating duct was initially not embossed and was also capable of storage for any length of time. Blanks 28 of the non-embossed material were compression molded in a press with a polyolefin/wood dust panel 34 (wood dust portion about 50%, polypropylene portion about 50%) adjusted to about 180° C. by means of an embossing tool 32 adjusted to 140° C. In this procedure, the polyolefin/wood dust panel was three-dimensionally deformed to a significant extent, so that the sheet carrier extended also over the concavely curved surface regions of the polyolefin/wood dust panel. The dwell time in the press was about 60 to 90 seconds. After pressing, it was found that the foam has become insensitive to pressure and a grain structure has been obtained as the impression of the embossing tool. Also, in this case, no bubbles occurred between the polyolefin/wood dust panel and the sheet carrier during pressing. The finest profiles of the embossing tool appeared in the grain structure. The press was also especially advantageous because the embossment pattern could be adjusted to the three-dimensional shape; for example, quilted seams and pleats could be placed at the correct location of the three-dimensional shape.

FIG. 4 shows an arrangement which differs from the arrangement according to FIG. 1 only in that an additional electrostatic flocking apparatus is provided. This electrostatic flocking apparatus 17 comprises a vibrating container 21 with a screen bottom 19 through which flock fiber is thrown onto the foam. A high voltage is applied in the conventional manner for accelerating and aligning the flock fibers.

EXAMPLE 8

The dispersions according to Examples 1 through 5 were beaten foamy with the addition of air in a foaming apparatus of the firm Hansa Werke, Bremen, Lürmann Schütte GmbH & Co., 2800 Bremen, Germany. The foam now essentially has a shaving foam-like consistency. The specific weight is about 200 g/l.

The foams obtained in this manner and discharged from the foaming apparatus were directly supplied to a coating knife device in which they were spread onto a polyester spunbonded web (60 g/m$^2$), in the amount of about 250 g foam per m$^2$ bonded web. During coating, the foam only superficially penetrated the upper strata of the bonded web.

The foam which was still wet was then electrostatically flocked with a sliced polyamide flock in a flock application device according to FIG. 4. The length of the flock was 0.75 mm. The yarn denier was 1.7 dtex. The weight of application per m$^2$ was about 80 g. The flocked sheet carrier 10 was then hardened in the heating tunnel 18 for a dwell time of about 7 minutes at temperatures which increased from 140° to 170° C. The flock adhesion was excellent after heating. A resistance to scraping was achieved which was comparable to the resistance to scraping of materials made of textile with similar surface structures.

The web obtained in this manner was then subjected in a calender 20 to a pressure treatment with a line pressure of about 600 to 1500 N/cm and a roller temperature of 200° C.

In a first case, both calender rollers were smooth. This resulted in a suede-like, felted surface with partially deflected fibers.

In a second case, an embossing roller 24 with textile character was used on the flocked side. This resulted in a textile-like surface of the flocked layer as illustrated in FIG. 4a. Depending on the type of roller, various textile types could be imitated.

In a third case, an embossing roller with a lever-like surface was used on the flocked side. Depending on the type of roller, various types of leather ranging from grained leather to suede could be imitated.

In all the cases of secondary treatment with pressure and heat, it was found that the flock adhesion, and particularly the resistance to scraping, were further improved; among other things, this could be caused by the fact that the secondary treatment resulted in an additional hardening and compacting of the foam.

EXAMPLE 9

In deviating from Example 8, the flocked surface was subjected to the influence of a rotating roller immediately after flocking. This roller was equipped with a plurality of leather tabs of such a length that the flocked surface of the passing web was hit by the strip under deflection of strip. This resulted in a shade effect on the flock layer. The foam was subsequently hardened in the manner described in Example 8.

EXAMPLE 10

In deviating from Example 8, immediately after the application of the flock while the foam was still wet, embossing was performed between cold rollers and drying was performed subsequently as in Example 8. The rollers were spaced in such a way that pressure was applied on the web only in the regions of the raised surface portions of the roller. Also in this manner, various patterns could be obtained, for example, textile and leather patterns, but not with the same fine structure that could be obtained by embossing after hardening.

EXAMPLE 11

Examples 1 through 5 were repeated, however, the foaming apparatus and the foam stabilizer of Example 1 were omitted. The dispersions of the Examples 1 through 5 modified in this manner were then supplied to a coating knife device 12 as shown in FIG. 4 in which they were spread onto a polyester spunbonded web 10 (60 g/m$^2$), in an amount of about 250 g foam per m$^2$ bonded web. During coating, the plastics material dispersion only superficially penetrated into the bonded web.

The coating of plastics material which was still wet was then electrostatically flocked with a sliced polyamide flock by means of the apparatus 17 shown in FIG. 4. The length of the flock was 0.75 mm. The yarn denier was 1.7 dtex. The weight of application per square meter was about 80 g. The flocked carrier 10 was then hardened in the heating duct 18 for a dwell time of about 7 minutes at temperatures rising from 140° to 170° C. The flock adhesion was excellent after heating. The resistance to scraping obtained was comparable to the resistance to scraping of materials made of textile with similar surface structures.

The web obtained in this manner was then subjected in a calender 20 to a pressure treatment with a line pressure of about 600 to 1500 N/cm and a roller temperature of 200° C.

In a first case, both calender rollers were smooth. This resulted in a suede-like, felted surface with partially deflected fibers.

In a second case, an embossing roller 24 with textile character was used on the flock side. This resulted in a textile-like surface of the flock layer, as illustrated in FIG. 4a.

Depending on the type of roller, various types of textiles could be imitated.

In a third case, an embossing roller with a leather-like surface was used on the flock side. Depending on the type of roller, various types of leather ranging from grained leather to suede could be imitated.

In all the cases of secondary treatment with pressure and heat, it was found that the flock adhesion, and particularly the resistance to scraping, were further improved; among other things, this could be caused by the fact that this secondary treatment resulted in an additional hardening and compacting of the plastics material coating.

EXAMPLE 12

In deviating from Example 11, the flocked surface was subjected to the influence of a rotating roller immediately after flocking. This roller was equipped with a plurality of leather tabs of such a length that the flocked surface of the passing web was hit by the strips under the deflection of the strips. This resulted in a shade effect on the flocked layer. The foam was subsequently hardened in the manner described in Example 11.

EXAMPLE 13

In deviating from Example 11, embossing was performed between cold rollers immediately after the application of the flock while the plastics material coating was still wet and hardening was performed subsequently as in Example 11. The spacing of the rollers was such that pressure was applied onto the web only in the regions of the raised surface portions of the roller 24. Also in this manner, various patterns, for example, textile and leather patterns, could be obtained, however, not with the same fine structure which resulted from embossing after hardening.

In FIG. 5, the sheet carrier is denoted by 10, the cross-linked plastics material layer by 36 and the electrostatically applied flock by 38. The plastics material layer may be a cross-linked plastic foam layer or a dense plastics material layer. FIGS. 5 further shows a backing 34. This backing 34 may be a solid plastics material panel, for example, of acrylonitrile-butadiene-styrene or polypropylene. The wall thickness of this solid plastics material layer can be 0.5 to 5 mm. This backing may remain plane; however, the backing can also be deformed by pressing or deep-drawing so that a three-dimensional article is obtained. The sheet carrier 10 can be connected to the backing 34 with the aid of an adhesion mediator 42. This adhesion mediator can be applied on the sheet carrier 10 and/or on the backing 34. In some cases, it may not be necessary to use an adhesion mediator, for example, if the sheet carrier 10 consists of a synthetic fiber bonded web which adheres well to the backing 34 through the application of heat and pressure. This is the case, for example, if the sheet carrier 10 is a polypropylene bonded fiber web and the backing 34 is a polypropylene panel. The connection between the sheet carrier 10 and the backing 34 can especially be produced by extruding a solid plastics material layer 34 and by feeding to the still thermoplastic extruded material the sheet carrier 10 which is already combined with the layers 36 and 38, wherein an adhesion mediator layer 40 which is possibly used could be co-extruded with the plastics layer 34.

The three-dimensional deformation can take place simultaneously with the combination of the sheet carrier 10 with the backing 34, for example, in a press.

Figure 6:
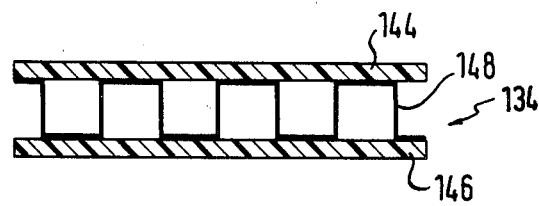

The backing 34 can also be replaced by a composite panel 134 as illustrated in FIG. 6. This composite panel 134 consists of cover layers 144 and 146 with a corrugated material 148 arranged therebetween; the corrugation of the material 148 may be rectangular. The cover layers 144,146 as well as the corrugated material may consist of plastics material, for example, polycarbonate, wherein the layers 144,146,148 can be produced by co-extrusion in the perpendicular direction to the drawing plane of FIG. 6.

The backing 34 can especially also be a plastics material layer to which a filler is added, for example, in so-called polyolefin/wood dust panel consisting approximately of 50% polyolefine and 50% wood dust. In this case, the panel 34 can be connected to the sheet carrier 10 by placing the sheet carrier 10 which has already been provided with the layers 36 and 38 onto the previously heated panel 34 and by compression molding, possibly with three-dimensional deformation, wherein, in the case of sufficient affinity between the sheet carrier 10 and the panel 34, the adhesion mediator 42 can be omitted. However, an adhesion mediator 42 can be provided in the form of a thermoplastic layer which is applied on the surface of the panel 34 and may consist of the same plastics material which is contained in panel 34.

Figure 7:

As illustrated in FIG. 7, the backing can also be formed of a rigid foam layer 234 which is combined with the sheet carrier with the aid of an adhesion mediator. For example, a polyurethane foam layer can be used as the rigid foam layer.

Figure 8:
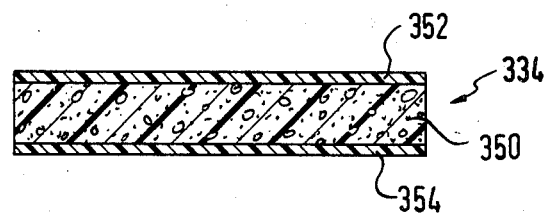

Furthermore, as illustrated in FIG. 8, the backing may be a sandwich panel 334 consisting of a middle layer 350 of rigid plastic foam, for example, polyurethane foam, and outer layers 352,354 which can consist of solid plastic material, for example, acrylonitrile-butadiene-styrene, of aluminum foil, of fabric web, of paper web or of bonded web. Also in this case, one of the outer layers 352,354 is connected, possibly with the aid of the adhesion mediator, to the sheet carrier which had already previously been provided with the layers 36 and 38.

Figure 9:
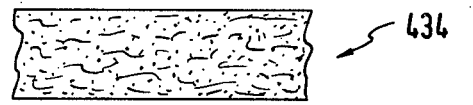

Another possibility for the backing is illustrated in FIG. 9 in which a panel 434 is shown; this panel 434 is formed of a heap of fibers with a binder, e.g. phenol resin, embedded therein. The heap of fibers which originally had a larger volume has been brought into the shape illustrated in FIG. 9 under the influence of heat and pressure, whereby the phenol resin was hardened.

The sheet carrier 10 can be fastened to this panel 434 with the aid of an adhesive 42 after the panel 434 has assumed the shape illustrated in FIG. 9; however, it is also conceivable to perform the connection during compression molding of the heap of fibers and to use, for this purpose, either a layer of adhesive additionally applied on the sheet carrier 10 or to depend on the adhesive action of the synthetic resin embedded in the heap of fibers. Particularly suitable fibers for the heap are cotton fibers.

The body illustrated in FIG. 5 can also comprise a plate of sheet metal as the backing, for example, sheet metal to be used for the body or the lining of the automobile, which is to be finished with the sheet carrier 10 carrying the flock 38. Also in the case of the combination with sheet metal, a adhesion mediator 42 can be used which is previously applied onto the sheet metal and/or the side of the sheet carrier 10 which faces toward the sheet metal.

FIG. 10 illustrates another possibility for combining a backing 534 with the sheet carrier 510 which had already been provided with the plastics material layer 536 and the flock 538. Analogous parts are provided with the same reference numerals as in FIG. 5, but each increased by the number 500. In a two-part mold consisting of the top mold half 556 and the bottom mold half 558, a blank of the sheet carrier already provided with the foam layer 536 and the flock 538 is placed, wherein the flock side 538 bears against the concave inner surface of the top mold half 556, possibly after a previous preliminary deformation. A plastics material body 534 is injection molded on the back side of the sheet carrier 510. The plastics material body 534 can also be a plastic foam body. For connecting the plastics material body 534 to the sheet carrier 510, an adhesion mediator 542 can be previously applied on the sheet carrier 510.

FIG. 11 shows an embodiment in which a positionally stable adhesion mediator layer 634 has been applied as the backing. This adhesion mediator layer 634 can be applied in the form of a coating or in the form of a foil; in any case, after the application, the consistency of the adhesion mediator layer 634 is such that the layer construction illustrated in FIG. 11 is capable of storage and transport, so that, with the aid of the adhesion mediator layer 634, it can be laminated onto another backing, wherein, for the purpose of lamination, the adhesion mediator layer 634 can be reactivated, for example, through heat. However, it is also conceivable that the adhesion mediator layer 634 is an adhesive layer which leads to adhesion as a result of pressure application alone. In this latter case, the adhesion mediator layer 634 can be covered by a dehesive foil or a foil treated with a release agent or a dehesive paper which is pulled off prior to processing.

In FIG. 12, finally, a soft foam layer 734 is illustrated as the backing which can be connected to the sheet carrier 10 again with the aid of an adhesion mediator 42 or through the conventional method of flame laminating, wherein, in flame laminating, the side of the soft foam layer 734 intended for connection is softened and made sticky by a flame travelling along this side.

For example, a sufficient adhesion can be achieved when the plastics material 36 penetrates into the sheet carrier 10 up to a depth of 5 to 30, preferable 10 to 20%, of the thickness of the sheet carrier.

We claim:

1. A method for producing a flocked web comprising:
   (a) applying a layer of a spreadable thermosetting plastic material in the form of a foam onto a porous sheet carrier, the viscosity of said spreadable material and the porosity of the sheet carrier being such that the spreadable material penetrates only into the upper portion of the porous sheet carrier and does not penetrate completely through the carrier;
   (b) applying flocked fibers onto the thermosetting plastic material layer;
   (c) partially crosslinking the thermosetting plastic layer to fix the flocked fibers in the thermosetting plastic material layer;
   (d) pressing the composite composed of the carrier sheet, partially crosslinked plastic material layer and flock between embossing tools, particularly embossing rollers, said embossing tools being heated so as to continue the crosslinking of the plastic material layer, wherein at least one of the embossing tools adjacent the flocked layer has an embossing design therein so as to provide a corresponding embossed pattern on the flocked layer;
   (e) connecting the side of the porous sheet carrier to a backing which increases the stiffness of the carrier, said backing being a polyolefin/wood-dust panel, said connecting being effected in a press having opposite pressing tools, said back panel being introduced in the hot state together with the sheet carrier carrying said flocked layer of plastic material foam between said pressing tools such as to effect connection of said porous sheet carrier and said panel under pressure exerted by said pressing tools through the thermoplastified polyolefin of the back panel.

2. The method of claim 1 wherein the connection is effected while simultaneously deforming the backing panel in three dimensions.

3. The method of claim 2 wherein an additional embossing of the flocked layer is effected between said parts of said press.

4. A flocked web obtained by the method of claim 3.

5. The method of claim 1 wherein the flock is electrostatically applied.

6. The method of claim 1 wherein the flock layer is embossed to exhibit a woven, knitted, or leather appearing surface.

7. The method of claim 1 wherein a sheet carrier is used which can be deformed to surfaces of a higher order.

8. The method of claim 1 wherein a fibrous carrier is used.

9. The method of claim 8 wherein the sheet carrier is a polyester spun-bonded web or polypropylene bonded fiber web.

10. The method of claim 9 wherein at least a portion of the fibers extend perpendicularly to the plane of said web.

11. The method of claim 10 wherein a needle bonded web is used as the sheet carrier.

12. The method of claim 10 wherein a woven or knitted material is used as the sheet carrier.

13. The method of claim 1 wherein the foam is based on an aqueous dispersion of a plastic material.

14. The method of claim 13 wherein the foam is based on an aqueous dispersion of a thermally crosslinkable polyacrylate.

15. The method of claim 14 wherein the aqueous dispersion contains an ammoniacal crosslinking agent.

16. The method of claim 14 wherein the aqueous dispersion contains thickeners, thixotropic agents, pigments or fillers.

17. The method of claim 14 wherein the aqueous dispersion contains an ethylene urea/triazine resin.

18. The method of claim 1 wherein the foam is based on a plastic material and is dissolved in a solvent.

19. The method of claim 1 wherein the foam is based on a liquid mixture of interacting components.

20. The method of claim 1 wherein the plastic material is applied as foam which has been foamed through mechanical treatment.

21. The method of claim 20 wherein a foam stabilizer is added.

22. The method of claim 1 wherein the carrier is attached to the backing with an adhesive.

23. The method of claim 1 wherein the connection is effected while simultaneously deforming the backing web in three dimensions between reciprocating top and bottom parts of a press while simultaneously embossing said flocked or the partially crosslinked plastics.

24. The method of claim 1 wherein the panel is about 50 percent by weight polypropylene and about 50 percent by weight wood dust.

25. The method of claim 1 wherein the plastic material is injection molded on the back side of said sheet carrier.

26. The method of claim 16 wherein a foam backing is applied onto the side of said sheet carrier opposite the flocked side.

27. The method of claim 16 wherein a positionally stable adhesion mediator layer is applied to the side of the carrier opposite the flocked side.

28. The method of claim 27 wherein the adhesion mediator layer is covered with a foil layer.

29. The method of claim 27 wherein said adhesion mediator layer is applied in the form of a coating.

30. The method of claim 1 wherein the sheet carrier is connected to a soft foam backing.

31. A flocked web obtained by the method of claim 1.

32. A method for producing a flocked web comprising:
 (a) applying a layer of a spreadable thermosetting plastic material in the form of a foam onto a porous sheet carrier, the side of said carrier opposite from the foam being connected with a backing which increases the stiffness of the carrier, said backing being a polyolefin/wood dust panel, the viscosity of said spreadable material and the porosity of the sheet carrier being such that the spreadable material penetrates only into the upper portion of the porous sheet carrier and does not penetrate completely through the carrier;
 (b) applying flocked fibers onto the thermosetting plastic material layer;
 (c) partially crosslinking the thermosetting plastic layer to fix the flocked fibers into the layer of the plastic material;
 (d) pressing the composite composed of the carrier sheet, partially crosslinked layer of plastic material and flock between pressing tools, said pressing tools being heated so as to continue the crosslinking of the plastic material, wherein at least one of the pressing tools adjacent the flocked layer has an embossed design therein so as to provide a corresponding embossed pattern on the flocked layer wherein the back panel is introduced in the hot state together with the sheet carrier carrying said flocked layer of plastic material foam between said pressing tools to effect connection of the sheet carrier by the thermoplastic binder of the backing panel.

* * * * *